Figure 4:
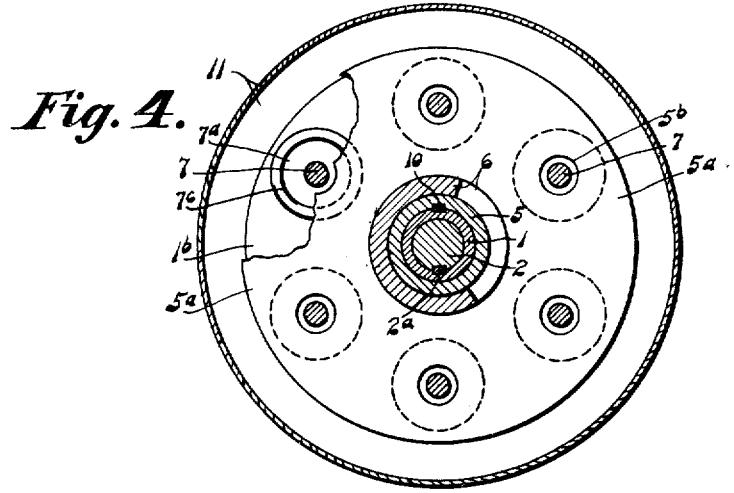

W. H. WELCH.
RESILIENT WHEEL.
APPLICATION FILED DEC. 27, 1917.
1,283,609.
Patented Nov. 5, 1918.
2 SHEETS—SHEET 1.
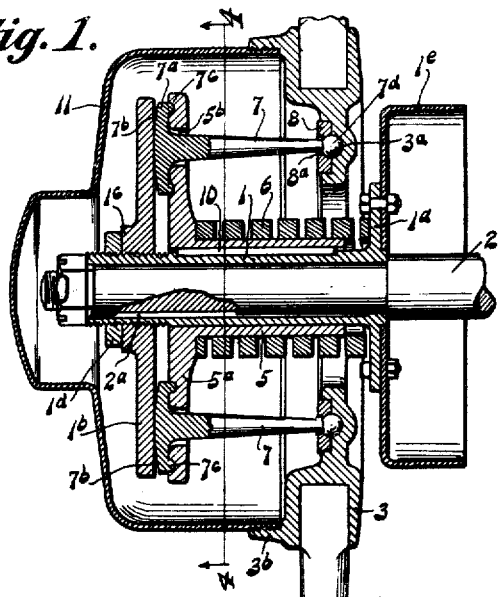
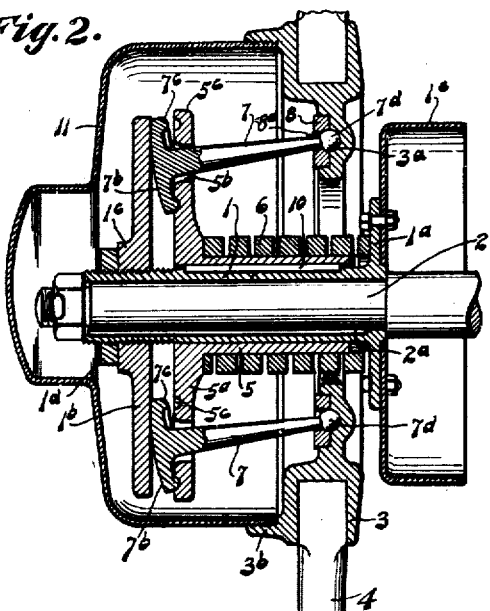
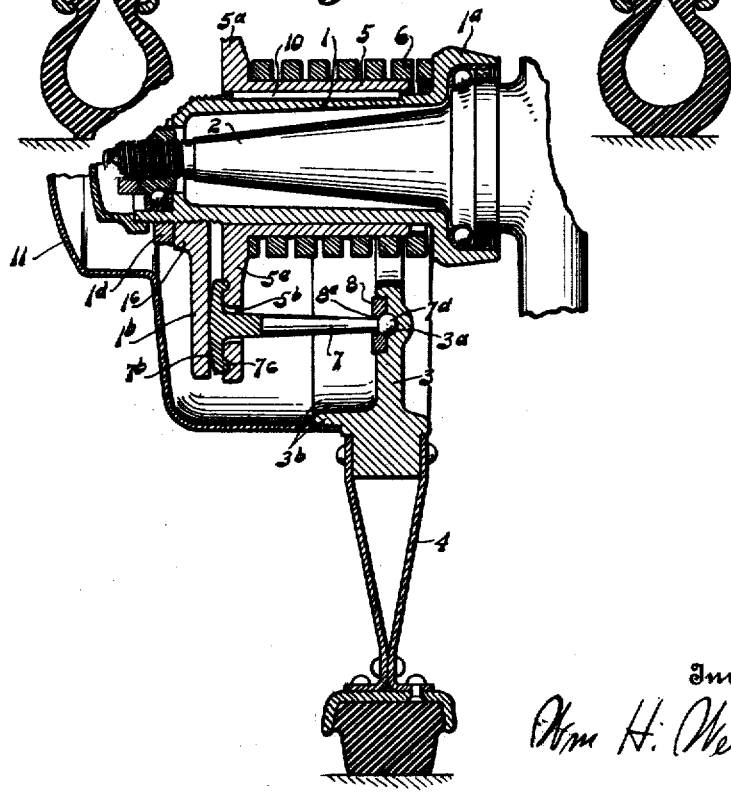
Inventor
Wm. H. Welch
By
Ok. E. Billman
Attorney

W. H. WELCH.
RESILIENT WHEEL.
APPLICATION FILED DEC. 27, 1917.

1,283,609.

Patented Nov. 5, 1918.
2 SHEETS—SHEET 2.

Inventor
Wm. H. Welch

By
Ted C. Billman
Attorney

UNITED STATES PATENT OFFICE.

WILLIAM H. WELCH, OF SALEM, OHIO.

RESILIENT WHEEL.

1,283,609.   Specification of Letters Patent.   Patented Nov. 5, 1918.

Application filed December 27, 1917. Serial No. 209,034.

*To all whom it may concern:*

Be it known that I, WILLIAM H. WELCH, a citizen of the United States, residing at Salem, in the county of Columbiana and State of Ohio, have invented certain new and useful Improvements in Resilient Wheels, of which the following is a specification.

My invention relates to improvements in resilient wheels, the primary object being to provide a generally improved wheel of this class which will not only be exceedingly simple in construction, cheap of manufacture, and efficient in use, but which will embody the advantages of and eliminate the objections now found in wheels of this class heretofore designed.

A further object is to improve and simplify the resiliently connected movable parts, together with improved means for adjusting and regulating the tension or sensitiveness of the resilient or spring connecting means, whereby the wheel, as a whole, may be readily and quickly adapted to varying superposed loads.

A still further object is the provision of improved means of assembling and disassembling the parts for the purpose of facilitating the adjustment and replacement of parts when worn or broken, as well as the provision of improved spring tensioning means and bearing connections whereby the parts are properly braced during their relative movements in the practical operation of the wheel, the improved wheel also having its parts so arranged and disposed relative to each other so as to provide a generally improved wheel of great strength and stability and at the same time having the requisite resiliency desired in this class of wheels.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a central vertical sectional view of a traction wheel constructed in accordance with this invention, the parts being shown in their normal or non-compressed position.

Fig. 2, a similar view, the parts being shown in their loaded or compressed position for the purpose of clearer illustration of the construction and operation of the movable spring resisted parts.

Fig. 3, a similar view of the same as embodied in a steering wheel and applied to an ordinary steering axle.

Fig. 4, a circumferential sectional view taken on line 4—4, of Fig. 1.

Figure 5:
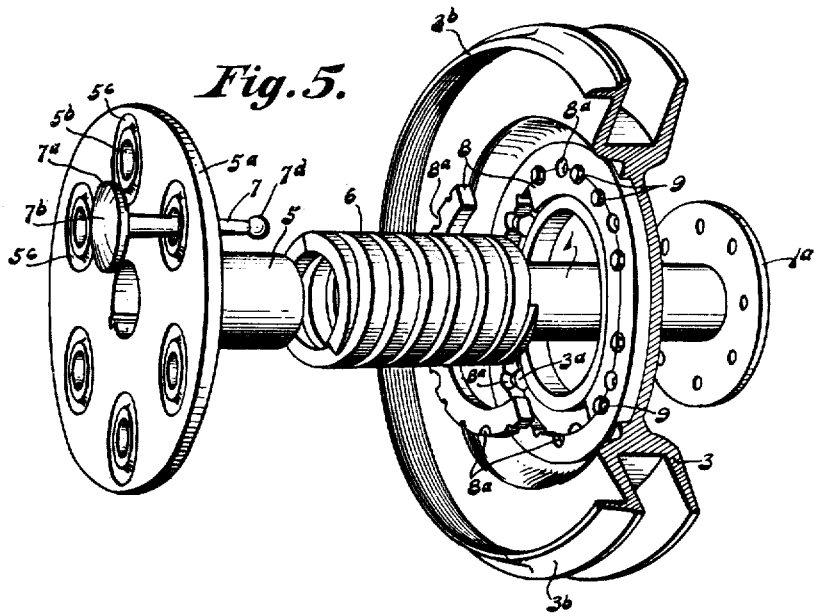

Fig. 5, a perspective disassembled view of the parts comprised in the improved wheel hub.

Similar numerals of reference designate like parts throughout all the figures of the drawings.

The hub or spindle sleeve 1, may be of any suitable and convenient construction, and so likewise as to the spindle shaft 2. When used as a driving or traction wheel the spindle sleeve 1, may be connected to the driving shaft 2, in any suitable and convenient manner, as for example, by means of a key member $2^a$, as shown in Figs. 1, 2, and 4, of the drawings. The sleeve 1, is provided with a fixed abutment $1^a$, in the present instance, in the form of a fixed disk or flange member, and the sleeve 1, is further provided near its opposite or outer end with a movable abutment or spring and lever tensioning member $1^b$, said abutment or tensioning member, in the present instance, being in the form of a disk and being provided with a central threaded nut portion $1^c$, threaded on a threaded portion on the outer end of the sleeve 1, and adapted to be secured in any desired adjusted position by means of a lock nut $1^d$. When used as a driving or traction wheel, the fixed abutment $1^a$, of the sleeve may be provided with a brake drum $1^e$.

As a means of resiliently connecting the spindle sleeve 1, to the wheel hub 3, adapted to carry and support a wheel 4, of any suitable and convenient construction, a hub or spindle suspending collar 5, is movably mounted about the sleeve 1, and is provided with a relatively fixed abutment $5^a$, in the form of a disk member arranged opposite and in coöperative relation to the adjustable abutment or tensioning member $1^b$, and as a means of resisting or cushioning the action of the longitudinally movable suspending collar 5, as moved by the action of the horizontal suspending levers as hereinafter described, a resilient or cushioning member 6, in the present instance, in the form of a helical compression spring, is interposed between the fixed abutment 1ª, and the abutment 5ª, of the suspending collar 5, and surrounds the latter as shown, and as a means of actuating the abutment 5ª, and the suspending collar 5, as well as operatively connecting the same to a wheel hub or flange member 3, the abutment disk 5ª, is provided with a series of openings 5ᵇ, adapted to receive and contain a series of horizontally extending hub suspending levers 7, the latter being provided with cam acting disk-shaped heads 7ª, the latter being provided with rounded bearing portions 7ᵇ, adapted to bear against the movable abutment or tensioning member 1ᵇ, the outer edges of said head 7ª, terminating in rounded bearing flanges 7ᶜ, seated in annular grooves 5ᶜ, of the abutment 5ª, carried by the hub suspending collar 5, and it will be obvious that this construction will permit of a universal rocking movement to be given to the heads 7ª, as the latter are moved by the hub suspending levers 7, connected to the body of the wheel as hereinafter described.

As a means of movably or flexibly connecting the ends of the levers 7, to the hub or flanged portion 3, of the wheel, the free ends of the suspending levers 7 are provided with ball members 7ᵈ, the latter being removably secured in socket bearings 3ª, of the wheel member 3, and on the inner sides of split rings 8, provided with openings 8ª, through which the ends of the levers 7, extend, said split bearing rings 8, being removably secured in position by means of attaching bolts, as shown most clearly in Fig. 5, of the drawings. In order to permit the suspending levers 7, to have the requisite universal or tilting movements while the wheel is in action, it will be observed that the openings 5ᵇ, in the abutment 5ª, and the openings 8ª, in the split rings 8, are formed larger in diameter than the adjacent portions of the levers 7, passing therethrough, and it will also be observed that the sensitiveness or action of the suspending levers 7, and of the wheel, as a whole, may be readily regulated as desired by moving and adjusting the spring and lever tensioning member 1ᵇ, in accordance with predetermined loads, the movement of the tensioning member 1ᵇ, being readily made by a wrench through the medium of the nut 1ᶜ, and the tensioning member being readily locked in any desired adjusted position through the medium of a lock nut 1ᵈ.

It will be seen that the suspending collar 5, is movable longitudinally of the spindle sleeve 1, and against the action of the spiral spring 6, by the action of the suspending levers 7, connected to the wheel hub 3, and as a means of preventing relative circumferential movement between the suspending collar or sleeve 5, and the spindle sleeve 1, said members 1 and 5, are provided with longitudinally extending key ways adapted to slidably receive and contain a suitable key member 10, and as a means of inclosing and protecting the working parts, the wheel hub or flange member 3, is provided with a detachably mounted hub cap or cover 11, which latter, in the present instance, is threaded to the hub 3, through the medium of an internally threaded flange 3ᵇ.

Upon reference to Figs. 1 and 2, of the drawings, it will be seen that the cam acting disk-shaped heads 7ª provide a variable fulcrum point of decreasing efficiency with respect to the lever action of the lever members 7, as the free ends of the latter are elevated and the wheel is moved upwardly toward the spindle by the action of the superposed load,—as will be apparent upon reference to the position of the parts as shown in Fig. 2, of the drawings, thereby giving an increasing ratio of resistance as the wheel proper is moved toward the spindle, while on the other hand, when the levers are in their normal or substantially horizontal position under ordinary conditions as illustrated in Fig. 1, of the drawings, the fulcrum points of the levers are shortened and the free ends of the levers and the adjacent parts are rendered correspondingly sensitive to the slight vibrations and shocks incident to the ordinary operation of the wheel.

From the foregoing description, taken in connection with the accompanying drawings, the operation and advantages of my invention will be readily understood.

Having thus described one of the embodiments of my invention what I claim and desire to secure by Letters Patent, is,—

1. In a resilient wheel, relatively fixed and movable sleeves provided with abutments, a spring interposed between the latter, suspending levers carried by said movable abutment and provided with heads having variable fulcrums, a wheel member flexibly connected to said levers and an adjustable abutment carried by said fixed sleeve against said variable fulcrums of said levers.

2. In a resilient wheel, horizontally fixed and movable flanged sleeve members, resilient means interposed between the flanged portions thereof, hub suspending levers carried by one of said sleeve members, a spring and lever tensioning member adjustably mounted on said fixed sleeve member and abutting against said lever members, and a wheel member flexibly connected to said lever members.

3. A resilient wheel, comprising fixed and laterally movable sleeves provided with abutment disks, resilient means interposed between the latter, an adjustable disk on said fixed sleeve and spaced from said abutment on said laterally movable sleeve, horizontal levers provided with variable fulcrum cam acting heads between said adjustable and movable abutment disks, and a wheel member flexibly carried by said levers.

4. In a resilient wheel, relatively fixed and movable spindle and hub sleeves provided with abutments, resilient means between the latter, suspending levers carried by said movable abutment and provided with flanged disk heads affording variable fulcrums, a wheel member connected to said levers and an adjustable abutment carried by said fixed sleeve against said disk heads of said levers and normally holding the latter and said disk heads in an untipped position.

5. In a resilient wheel, a spindle sleeve provided with an abutment, a laterally movable hub sleeve provided with an abutment, a spring surrounding said hub sleeve and interposed between said abutments, hub suspending levers carried by said hub sleeve abutment, a wheel body connected to said levers and an abutment adjustably mounted on said spindle sleeve and abutting against said levers and adapted to move the latter against said spring and laterally movable hub sleeve.

6. In a resilient wheel, a fixed sleeve provided with an end abutment, a laterally movable surrounding sleeve provided with an end abutment, a spring surrounding said movable sleeve between said abutments, suspending levers having disk-shaped heads carried by said sleeve abutment, a wheel body connected to said levers and an abutment adjustably mounted on said spindle sleeve and against said disk-shaped heads of said levers and adapted to normally hold the latter in a horizontal position by the resistance of said spring and said laterally movable sleeve.

7. A resilient wheel, comprising fixed and laterally movable sleeves provided with abutment disks, resilient spring means interposed between the latter, an adjustable disk on said fixed sleeve and spaced from said abutment on said laterally movable sleeve, horizontal levers provided with variable fulcrum cam acting disk heads between said adjustable and movable abutment disks, and a wheel member flexibly carried by said levers at right angles to the latter and against the resistance offered by said levers and spring means.

8. In a resilient wheel, horizontally fixed and movable sleeve members carrying abutments, resilient means between said abutments, hub suspending levers carried by said abutment on said movable sleeve member and provided with disk-shaped heads, a spring and lever tensioning member adjustably mounted on said fixed sleeve member and against said disk-shaped heads of said lever members, and a wheel member flexibly connected to said lever members and adapted to tip said disk-shaped heads against the resistance of said spring resisted movable abutment and sleeve.

9. A resilient wheel, comprising a spindle member having fixed and adjustable abutment disks, a hub suspending collar provided with an abutment disk, horizontal hub suspending levers movably carried by the latter and having cam acting heads interposed between the same and said adjustable abutment disk, a spring interposed between said spindle and collar abutment disks and tending to hold the latter away from each other and to hold said levers in their normal horizontal position, and a wheel member flexibly connected to said levers and extending at right angles thereto.

10. A resilient wheel, comprising longitudinally fixed and movable sleeve members provided with abutments, a coiled spring interposed between the latter, hub suspending levers carried by said abutment on said movable sleeve member and provided with variable fulcrum cam acting heads, a disk member adjustably mounted on said fixed sleeve member and bearing against said cam acting heads, and a wheel member flexibly carried by said levers at right angles to the latter and said spring and sleeve members and movable toward and from the latter with the movement of said levers and spring.

11. A resilient wheel, comprising a spindle member having fixed and adjustable abutments, a laterally movable hub suspending member carrying an abutment, horizontal hub suspending levers carried in the latter and having variably fulcrumed heads between said fixed and adjustable abutments, a spring interposed between said fixed and movable abutments and normally holding said movable abutment against said variably fulcrumed heads whereby said levers are held in a horizontal position, and a wheel member flexibly connected to the opposite ends of said levers and extending at right angles thereto.

12. A resilient wheel, comprising longitudinally fixed and movable sleeve members provided with abutments, a coiled expansion spring between the latter, hub suspending levers normally carried by said abutment on said movable sleeve member in a horizontal position and provided with cam acting disk heads presenting varying fulcrums, a disk member adjustably mounted on said fixed sleeve member and bearing against said cam acting disk heads and normally holding the latter in an untipped position, and a wheel member flexibly carried by said levers at right angles to said spring and sleeve members and movable toward and from the latter with the tipping movements of said disk heads and levers and the compressing movements of said spring.

13. A resilient wheel, comprising longitudinally fixed and movable flanged sleeve members, a spring interposed between the flanged portions thereof and surrounding said movable sleeve member, horizontally arranged hub suspending levers surrounding the latter and provided with cam acting heads movably disposed at one side of the flanged portion thereof, a spring and lever tensioning disk adjustably mounted on said fixed sleeve member and bearing directly and indirectly against said cam acting heads and movable sleeve member respectively, and a wheel member flexibly carried by said levers and movable toward and from said sleeve members against the resistance of said levers and spring.

14. A resilient wheel, comprising longitudinally fixed and movable sleeve members carrying disk-shaped abutments, a spring interposed between the latter and surrounding said movable sleeve member, horizontally arranged hub suspending levers surrounding the latter and provided with cam acting variably fulcruming heads movably disposed at one side of said movable abutment, a tensioning disk adjustably mounted on said fixed sleeve member and bearing directly and indirectly against said variably fulcruming heads and movable sleeve member respectively and normally holding said heads on their shorter fulcrums, and a wheel member flexibly carried by said levers against the resistance of said levers and spring.

15. In a resilient wheel, a spindle member provided with fixed and adjustable disks, a longitudinally movable sleeve provided with a disk interposed between said fixed and adjustable disks, horizontally extending levers carried by said movable sleeve disk and provided with heads having variable fulcrums interposed between said adjustable and movable disks, a resilient member surrounding said movable sleeve and interposed between said fixed and movable disks and normally holding said levers in a horizontal position with their shorter fulcrum points between said disks, and a wheel member flexibly connected to said levers and adapted to move the latter radially and circumferentially of said disk and sleeve members through said variable fulcrums and against said resilient member.

16. In a resilient wheel, a spindle member provided with fixed and adjustable disks, a longitudinally movable sleeve provided with a disk interposed between said fixed and adjustable disks, horizontally extending levers carried by said movable sleeve disk and provided with flanged disk heads presenting increasing fulcrum points between said adjustable and movable disks with the tipping movements of said levers, a coiled spring member surrounding said movable sleeve and extending between said fixed and movable disks normally holding said levers in a horizontal position with their shorter fulcrum points between said disks, and a wheel member flexibly connected to said levers and adapted to move the latter radially and circumferentially of said disk and sleeve members through said variable fulcrum points and against said coiled spring.

In testimony whereof I have affixed my signature in the presence of two witnesses.

WILLIAM H. WELCH.

Witnesses:
 WM. C. GRAVES,
 O. C. BILLMAN.